(12) United States Patent
Shoarinejad et al.

(10) Patent No.: US 7,991,080 B2
(45) Date of Patent: Aug. 2, 2011

(54) RFID DECODING SUBSYSTEM WITH DECODE MODULE

(75) Inventors: Kambiz Shoarinejad, Los Angeles, CA (US); Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1410 days.

(21) Appl. No.: 11/491,020

(22) Filed: Jul. 20, 2006

(65) Prior Publication Data
US 2008/0049870 A1   Feb. 28, 2008

(51) Int. Cl.
*H04L 27/00* (2006.01)
(52) U.S. Cl. ........................................................ 375/324
(58) Field of Classification Search .................. 375/324, 375/333, 361; 341/70; 340/10.1, 572.4
See application file for complete search history.

(56) References Cited

U.S. PATENT DOCUMENTS

| | | | | |
|---|---|---|---|---|
| 3,737,895 A | * | 6/1973 | Cupp et al. ....................... 341/71 |
| 3,916,084 A | * | 10/1975 | Toole ............................. 375/371 |
| 4,139,870 A | * | 2/1979 | Tachi ............................. 360/43 |
| 4,746,898 A | * | 5/1988 | Loeppert ......................... 341/70 |
| 4,992,790 A | * | 2/1991 | Montgomery .................... 341/70 |
| 5,195,110 A | * | 3/1993 | Gorshe ........................... 375/355 |
| 5,953,063 A | * | 9/1999 | Hidaka ......................... 348/384.1 |
| 7,133,482 B2 | * | 11/2006 | Poletto et al. .................. 375/361 |
| 7,155,172 B2 | * | 12/2006 | Scott ............................. 455/70 |
| 2007/0172007 A1 | * | 7/2007 | Shoarinejad et al. ........... 375/361 |

OTHER PUBLICATIONS

SJ Kim et al., "An Ultra Low Power UHF RFID Tag Front-End for EPCglobal Gen2 with Novel Clock-Free Decoder",IEEE international Symp,Circuits and systems, 2008, pp. 660-663.*

* cited by examiner

*Primary Examiner* — Chieh M Fan
*Assistant Examiner* — Jaison Joseph
(74) *Attorney, Agent, or Firm* — Garlick Harrison & Markison; Bruce E. Garlick

(57) ABSTRACT

A radio frequency identification (RFID) decoding subsystem includes a pre-decode module and a decode module. The pre-decode module is coupled to process down-converted RFID signals into pre-decoded baseband data. The decode module is coupled to: enable a counting process based on the pre-decoded baseband data to produce a count resultant; and compare the count resultant with a threshold at a data bit interval to produce decoded RFID data.

16 Claims, 14 Drawing Sheets

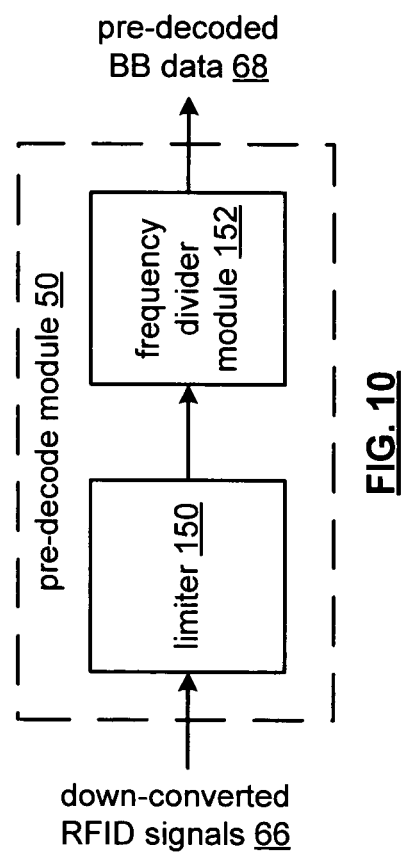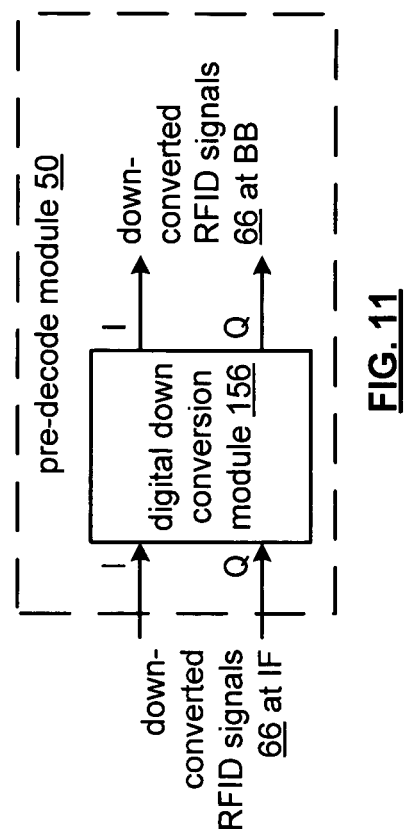

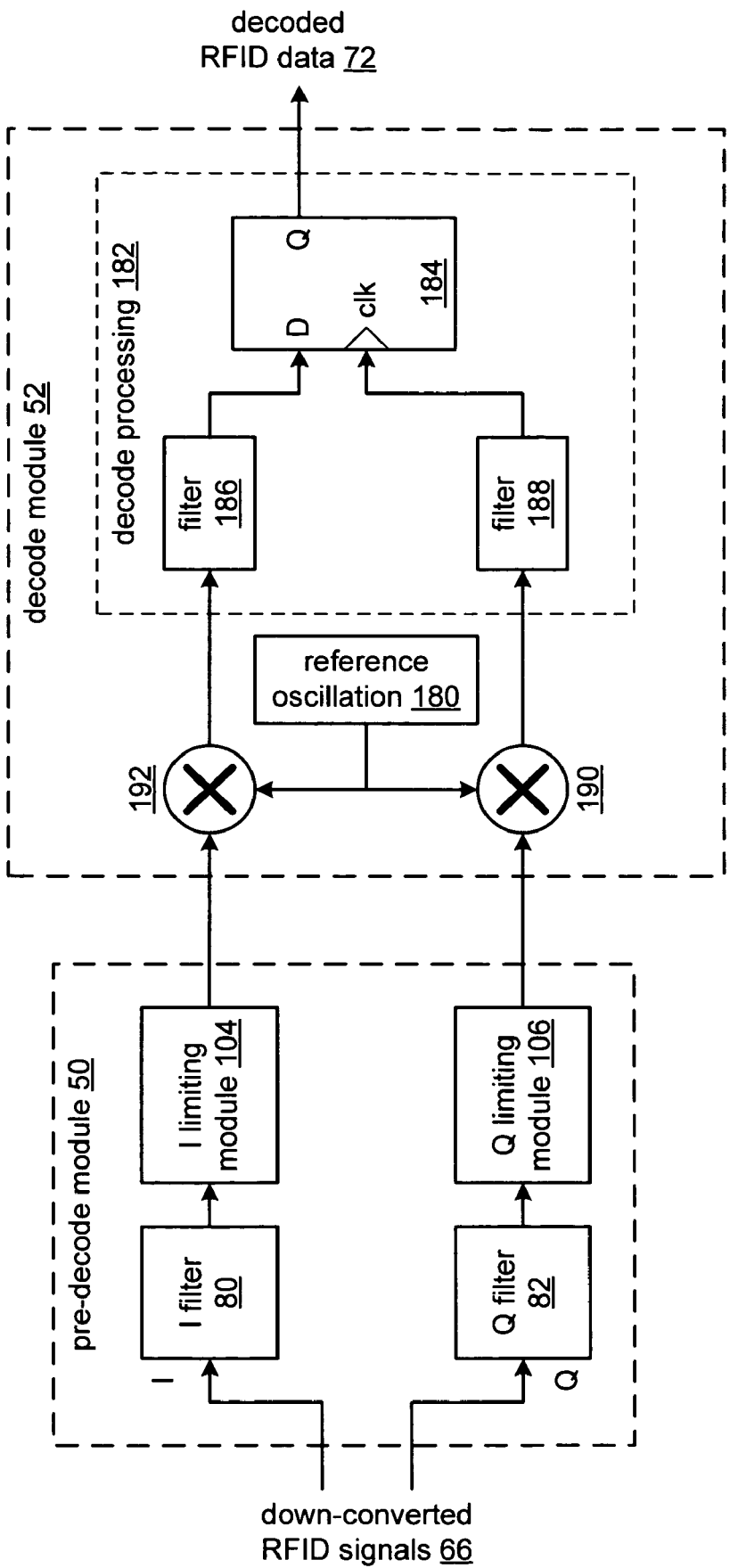

RFID DECODING SUBSYSTEM WITH DECODE MODULE

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention related generally to digital signal processing and more particularly to encoding and decoding of data.

2. Description of Related Art

As is known, some radio frequency identification (RFID) systems utilize FM0 and/or FM1 encoding/decoding schemes, which are both bi-phase encoding schemes, for tag to reader communications. Other RFID systems may utilize various classes of encoding/decoding schemes based on the different standards such as EPC (Electronic Product Code) or ISO standards. As is further known, on the reverse tag-to-reader link, EPC Class 1 uses a four-interval bit cell encoding while EPC Class 1 Gen 2 and ISO 18000-6 standards use FM0 bi-phase encoding that has a state transition at every bit boundary. Also EPC class 0 encoding is based on frequency shift keying (FSK) encoding.

For FM0 a logic one is represented as a single state from bit boundary to bit boundary and a logic zero is represented as two states from bit boundary to bit boundary with one transition in the middle of the bit. For example, if the state of the previous encoded bit is −1 at the beginning of the data clock cycle for the present encoded bit, then, for a logic one, the state transitions to +1 and is maintained for the duration of the data clock cycle. If, however, the state of the previous encoded bit is +1 at the beginning of the data clock cycle for the present encoded bit, then, for a logic one, the state is transitioned to −1, which is maintained for the duration of the data clock cycle.

Continuing with the above example, if the state of the previous encoded bit is −1 at the beginning of the data clock cycle for the present encoded bit, then, for a logic zero, the state transitions twice during the data clock cycle: from −1 to +1 and then from +1 to −1. If, however, the state of the previous encoded bit is +1 at the beginning of the data clock cycle for the present encoded bit, then, for a logic zero, the state transitions twice during the data clock cycle: from +1 to −1 and then from −1 to +1. FM1 functions in a similar manner, but represents a logic zero with a single state from bit boundary to bit boundary and a logic one with a two states from bit boundary to bit boundary with one transition in the middle of the bit.

As mentioned, FM0 encoding is currently used, for example, for tag-to-reader communication in EPC Class 1 Gen 2 and ISO 18000-6 RFID standards. EPC class 1 encoding is similar to FM1 encoding, but includes additional transitions with the bit. For example, a logic zero is represented by state transitions at the boundaries of a bit and a single transition within the bit and a logic one is represented by state transitions at the boundaries of a bit and three transitions within the bit.

Conventional bi-phase decoders for FM0 and/or FM1 encoded data (e.g., as in EPC Class 1 Gen 2 and in ISO 18000-6) and for the four-interval bit cell encoded data (e.g., as in EPC Class 1) are bit by bit decoders that include a pair of matched filters, a data slicer, and an absolute value comparator. A first matched filter of the pair of matched filters has a filter response that corresponds to a single state transition and the second matched filter has a filter response that corresponds to a double state transition. The data slicer receives the outputs of the matched filters and produces a digital value representation thereof. The absolute value comparator compares the digital value representations to determine whether the encoded data represents a logic one or a logic zero.

As is generally accepted in the art of encoding/decoding, bit error rate (BER) is a function of signal to noise ratio and the encoding process. For bi-phase decoders, the encoding process is achieved by encoding a bit as either a single state within a data clock cycle, a dual state within a data clock cycle, or four states within a data clock cycle. Thus, from bit to bit, the resulting encoded value will be different. As is also generally accepted, the difference between encoded values can be measured using a Hamming distance (i.e., the number of bits that differ from encoded word to encoded word). A decoder's sensitivity (i.e., ability to accurately decode encoded data as the signal to noise ratio decreases) is a function of a minimum Hamming distance (i.e., the minimum number of bits that differ from any encoded word to any other encoded word), which for conventional FM0 and FM1 decoders is one. As such, for decoders, including EPC class 1, FM0 and FM1 decoders, the BER is a function of the signal to noise ratio and the minimum Hamming distance.

Therefore, a need exists for a method and apparatus of decoding bi-phase and/or FSK encoded data that improves bit error rate relative to signal to noise ratio performance, improves overall performance, and/or improves manufacturability.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 10 is a schematic block diagram of another embodiment of a pre-decode module in accordance with the present invention;

FIG. 11 is a schematic block diagram of another embodiment of a pre-decode module in accordance with the present invention;

FIG. 15 is a schematic block diagram of another embodiment of an RFID decoding subsystem in accordance with the present invention.

DETAILED DESCRIPTION OF THE INVENTION

Figure 1:
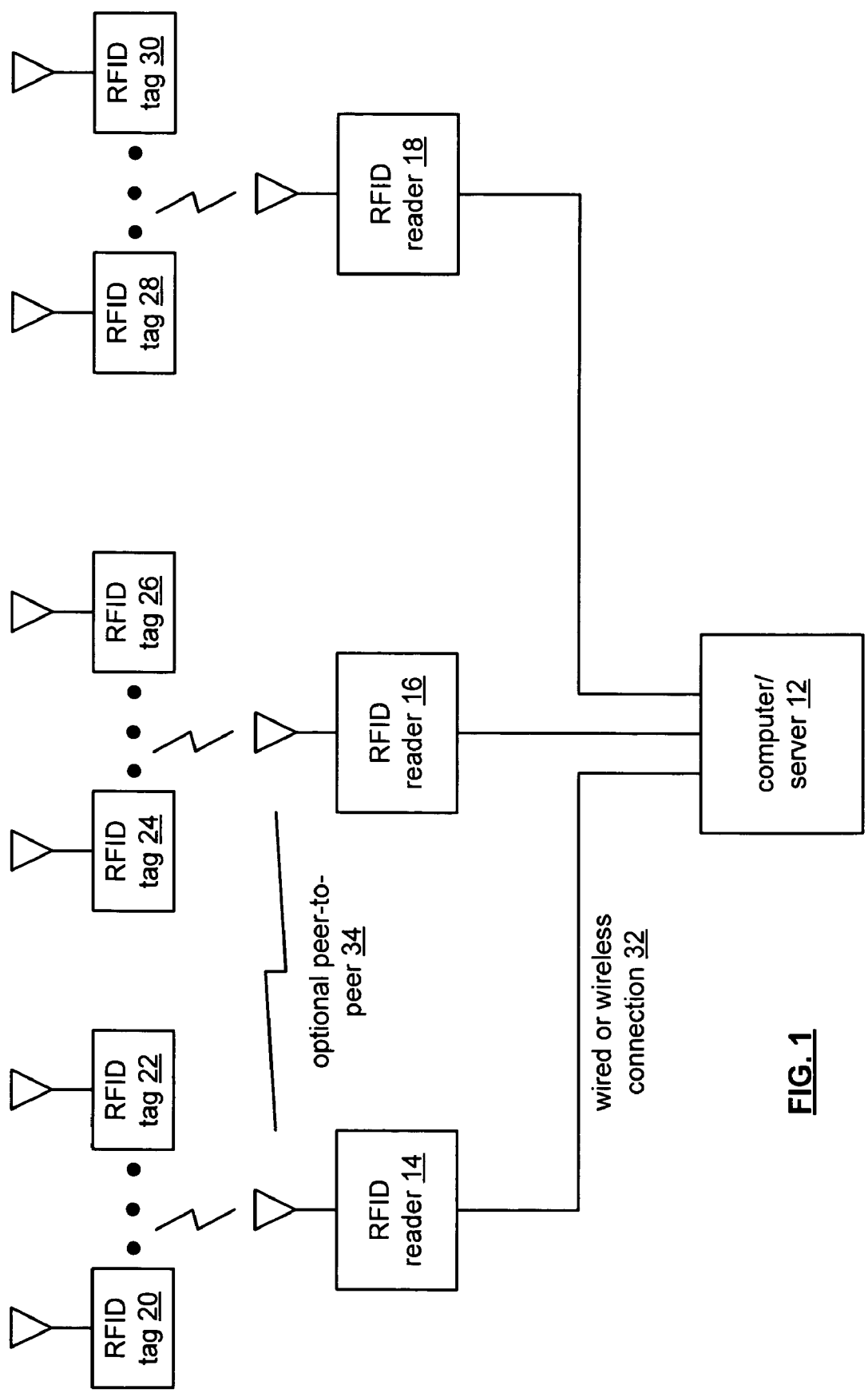
FIG. 1 is a schematic block diagram of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera.

Each RFID reader 14-18 wirelessly communicates with one or more RFID tags 20-30 within its coverage area. For example, RFID reader 14 may have RFID tags 20 and 22 within its coverage area, while RFID reader 16 has RFID tags 24 and 26, and RFID reader 18 has RFID tags 28 and 30 within its coverage area. The RF communication scheme between the RFID readers 14-18 and RFID tags 20-30 may be a backscattering technique whereby the RFID readers 14-18 provide energy to the RFID tags via an RF signal. The RFID tags derive power from the RF signal and respond on the same RF carrier frequency with the requested data.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via the peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag would store the data in a non-volatile memory.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. Communications between RFID reader 16 and computer/server 12 are conveyed through RFID reader 14 and the wired or wireless connection 32, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. Note that the computer/server 12 may be coupled to another server and/or network connection to provide wide area network coverage.

Figure 2:
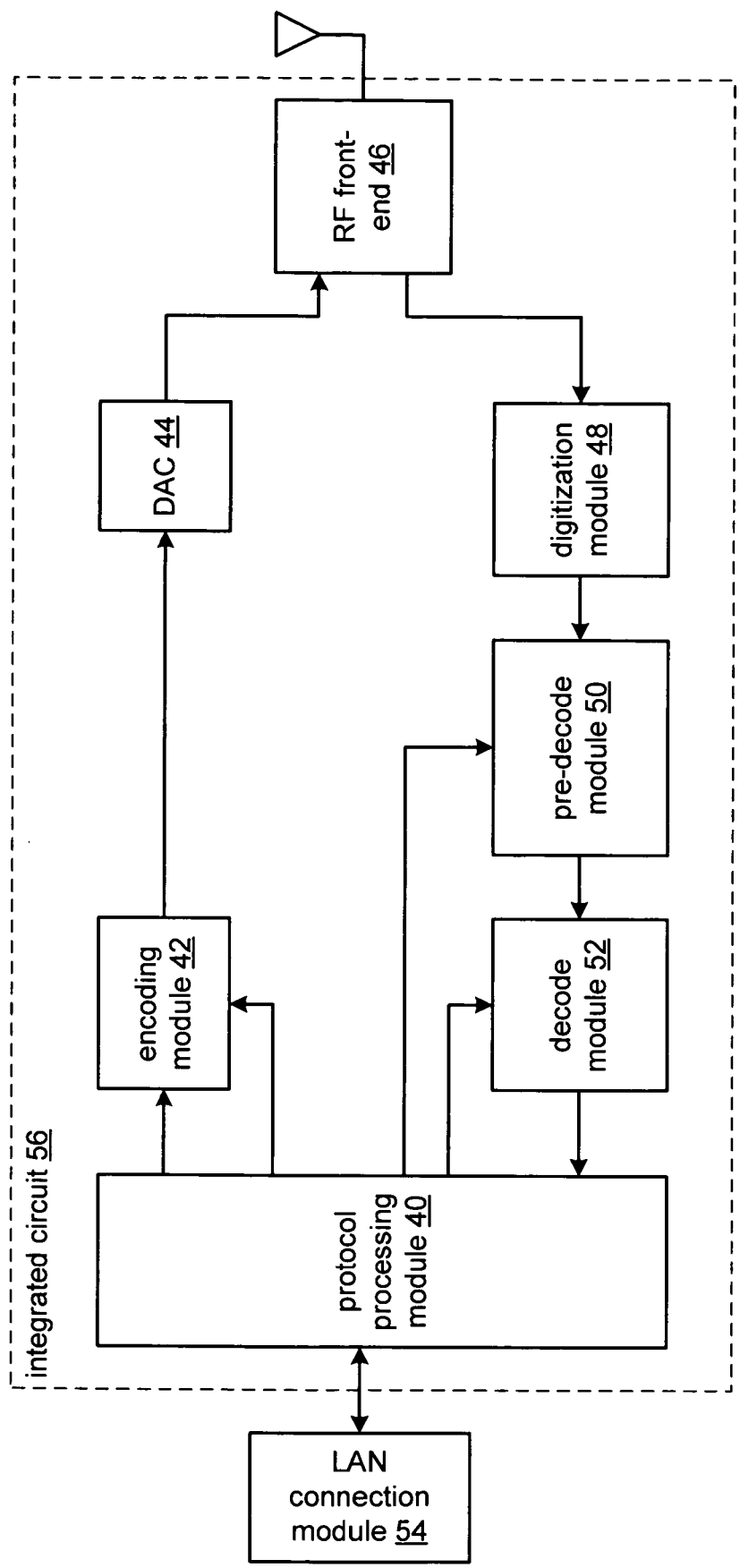
FIG. 2 is a schematic block diagram of an RFID reader in accordance with the present invention.

FIG. 2 is a schematic block diagram of an RFID reader 14-18 that includes an integrated circuit 56 and may further include a local area network (LAN) connection module 54. The integrated circuit 56 includes protocol processing module 40, an encoding module 42, a digital-to-analog converter (DAC) 44, an RF front-end 46, digitization module 48, and a decoding subsystem, which includes a pre-decode module 50 and a decode module 52. The local area network connection module 54 may include one or more of a wireless network interface (e.g., 802.11n.x, Bluetooth, et cetera) and/or a wired communication interface (e.g., Ethernet, fire wire, et cetera).

The protocol processing module 40 is operably coupled to prepare data for encoding via the encoding module 42 which may perform a data encoding in accordance with one or more RFID standardized protocols. The encoded data is provided to the digital-to-analog converter 44 which converts the digitally encoded data into an analog signal. The RF front-end 46 modulates the analog signal to produce an RF signal at a particular carrier frequency.

The RF front-end 46 includes transmit blocking capabilities such that the energy of the transmit signal does not substantially interfere with the receiving of a backscattered RF signal received from one or more RFID tags. The RF front-end 46 converts the received RF signal into a baseband signal. The digitization module 48, which may be a limiting module or an analog-to-digital converter, converts the received baseband signal into a digital signal. The pre-decode module 50, as will be described in greater detail with reference to at least some of FIGS. 3-15, converts the digital signal into a biphase encoded signal or mixed signal in accordance with the particular RFID protocol being utilized. The biphase encoded or mixed signal is provided to the decoding module 52, which recaptures data therefrom in accordance with the particular encoding scheme of the selected RFID protocol as will be described in greater detail with reference to at least some of FIGS. 3-15. The protocol processing module 40 provides the recovered data to the server and/or computer via the local area network connection module 54. As one of ordinary skill in the art will appreciate, the RFID protocols (such as EPC class 0, EPC class 1, EPC Class 1 Gen 2, ISO 18000-6, etc.) utilize one or more of line encoding schemes such as Manchester encoding, FM0 encoding, FM1 encoding, four-interval bit cell encoding, etc.

Figure 3:
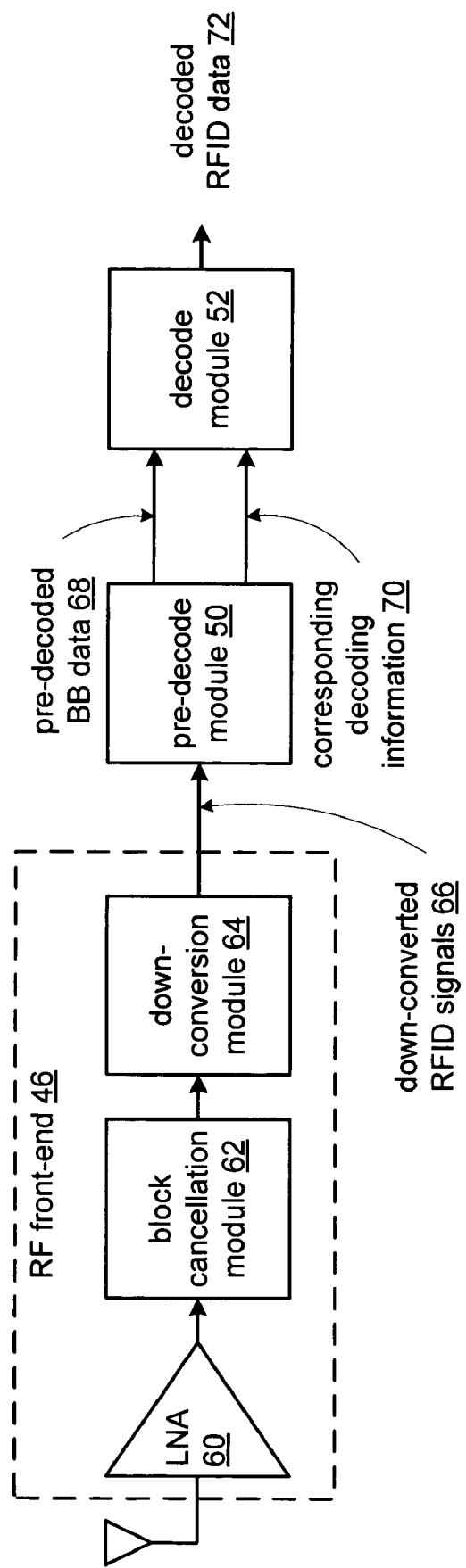
FIG. 3 is a schematic block diagram of an embodiment of an RFID reader receiver in accordance with the present invention.

FIG. 3 is a schematic block diagram of an embodiment of an RFID reader receiver that includes the RF front-end 46, the pre-decode module 50, and the decode module 52. The RF front-end 46 includes a low noise amplifier (LNA) 60, a block cancellation module 62, and a down conversion module 64. As one of ordinary skill in the art will appreciate, modules 50, 52, and 64 may be implemented using separate processing modules, a common processing module, and/or a combination thereof. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in at least some of FIGS. 3-15.

In operation, the low noise amplifier 60 is coupled to amplify an inbound RF signal to produce an amplified inbound RF signal. The block cancellation module 62 is coupled to receive an outbound RF signal from a transmitter of the RFID reader and to substantially cancel a blocking signal from the amplified inbound RF signal using the outbound RF signal and substantially pass the modulated RF signal. The down-conversion module 64 is coupled to convert the modulated RF signal into down-converted RFID signals 66. Note that the down-converted RFID signals 66 may be real or complex baseband signals, real or complex near baseband signals (e.g., having an intermediate frequency closer to baseband than closer to the carrier frequency of the RF signal), an in-phase component signal, and/or a quadrature component signal. Further note that the RF front-end 46 may also include an analog to digital converter, such that the down-converted RFID signals 66 may be converted to digital signals before being provided to the pre-decode module 50.

The pre-decode module 50 is coupled to process the down-converted RFID signals 66 into pre-decoded baseband (BB) data 68 and/or corresponding decoding information 70. Note that in at least one embodiment of the pre-decode module 50, it produces only the pre-decoded baseband data 68. The decode module 52 is coupled to process the pre-decoded baseband data 68 into decoded RFID data 72. In at least one embodiment of the decode module 50, it produces the decoded RFID data 72 from the pre-decoded baseband data 68 based on the corresponding decoding information 70. In at least one other embodiment of the decode module 50, it produces the decoded RFID data 72 directly from the pre-decoded baseband data 68.

Figure 4:
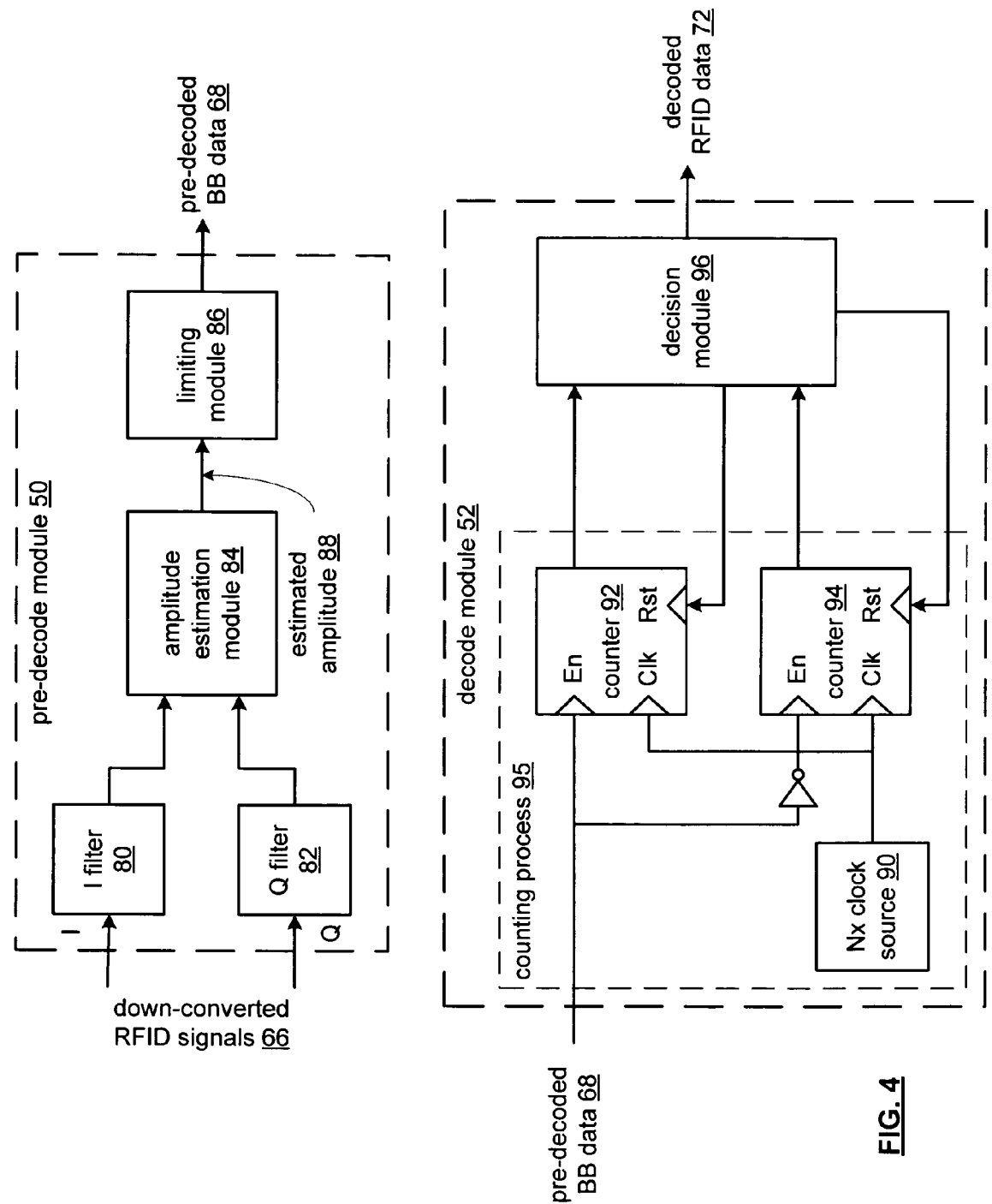
FIG. 4 is a schematic block diagram of an embodiment of an RFID decoding subsystem in accordance with the present invention.

FIG. 4 is a schematic block diagram of an embodiment of an RFID decoding subsystem that includes the pre-decode module 50 and the decode module 52. The pre-decode module 50 includes an in-phase (I) filter 80, a quadrature (Q) filter 82, an amplitude estimation module 84, and a limiting module 86. The decode module 52 includes a counting process 95 and a decision module 96. The counting process 95 includes an Nx clock source 90 (i.e., with a clock frequency N times the symbol rate), a first counter 92, a second counter 94, and an inverter.

The I and Q filters 80 and 82, which may be low pass filters or bandpass filters, filter I component of the down-converted RFID signals 66 to produce filtered I component signals and filter Q component of the down-converted RFID signals 66 to produce filtered quadrature component signals, respectively. The amplitude estimation module 84 is coupled to estimate amplitude of the down-converted RFID signals 66 based on the filtered I and Q component signals to produce an estimated amplitude. In one embodiment, the amplitude estimation module 84 performs the function of:

$$\sqrt{I^2 + Q^2},$$

where I represents amplitude of the in-phase component signals and Q represents amplitude of the quadrature component signals. In another embodiment, the amplitude estimation module 84 estimates the approximate amplitude using one or more of a plurality of amplitude estimation techniques. One such technique is to perform the function of: $\max(|I|,|Q|)+0.5*\min(|I|,|Q|)$. As one of ordinary skill in the art will appreciate, other approximations and/or techniques may be used to determine the amplitude.

The limiting module 86 is coupled to produce the pre-decoded baseband data based on the estimated amplitude. In one embodiment, the limiting module 86 limits the received data to a logic 1 state or a logic 0 state. As such, a bit of pre-decoded baseband data 68 will be in accordance with a bi-phase encoding scheme (e.g., FM0, FM1, etc.).

The first counter 92 is enabled when the pre-decoded baseband data 68 is in a first state (e.g., a logic 1) and the second counter 94 is enabled when the pre-decoded baseband data 68 is in a second state (e.g., a logic 0). After a reset signal from the decision module 96, which occurs at every bit boundary or a grouping of bit boundaries, the first or second counter 92 or 94 begins counting cycles of the clock signal produced by the Nx clock source 90 for at least one period of a data rate interval (e.g., duration from one bit boundary to the next) to produce a first and second count, respectively. In one embodiment, x corresponds to the bit rate of the decoded RFID data 72 and N is a multiplier, or oversampling factor, of two or more.

The decision module 96, which may be implemented via finite state machine logic and/or a processing module, receives the first and second counts and determines therefrom the decoded RFID data 72. In one embodiment, the decision module 96 functions to compare the first count with a first threshold and to compare the second count with a second threshold. The decision modules 96 then decodes the pre-decoded baseband signal for the at least one period of the data rate interval as a first decoded value (e.g., as a logic 1 for FM0) when the first and second counts compare unfavorably with the first and second thresholds. Alternatively, when the first count and the second count compares favorably with the first and second thresholds, the decision module 96 decodes the pre-decoded baseband signal for the at least one period of the data rate interval as a second decoded value (e.g., as a logic 0 for FM0). In another embodiment, the decision module 96 obtains the difference between the first and the second count. It then compares this count difference with a threshold. The decision module 96 then decodes the pre-decoded baseband signal for the at least one period of the data bit interval as a first decoded value (e.g., logic 0 in FM0) if the count difference is lower than the threshold. Otherwise, if the count difference is larger than the threshold, the decision module 96 assumes no state transition in between the bit boundaries and therefore decodes the pre-decoded baseband signal for the at least one period of the data bit interval as a second decoded value (e.g., logic 1 in FM0).

Figure 5:
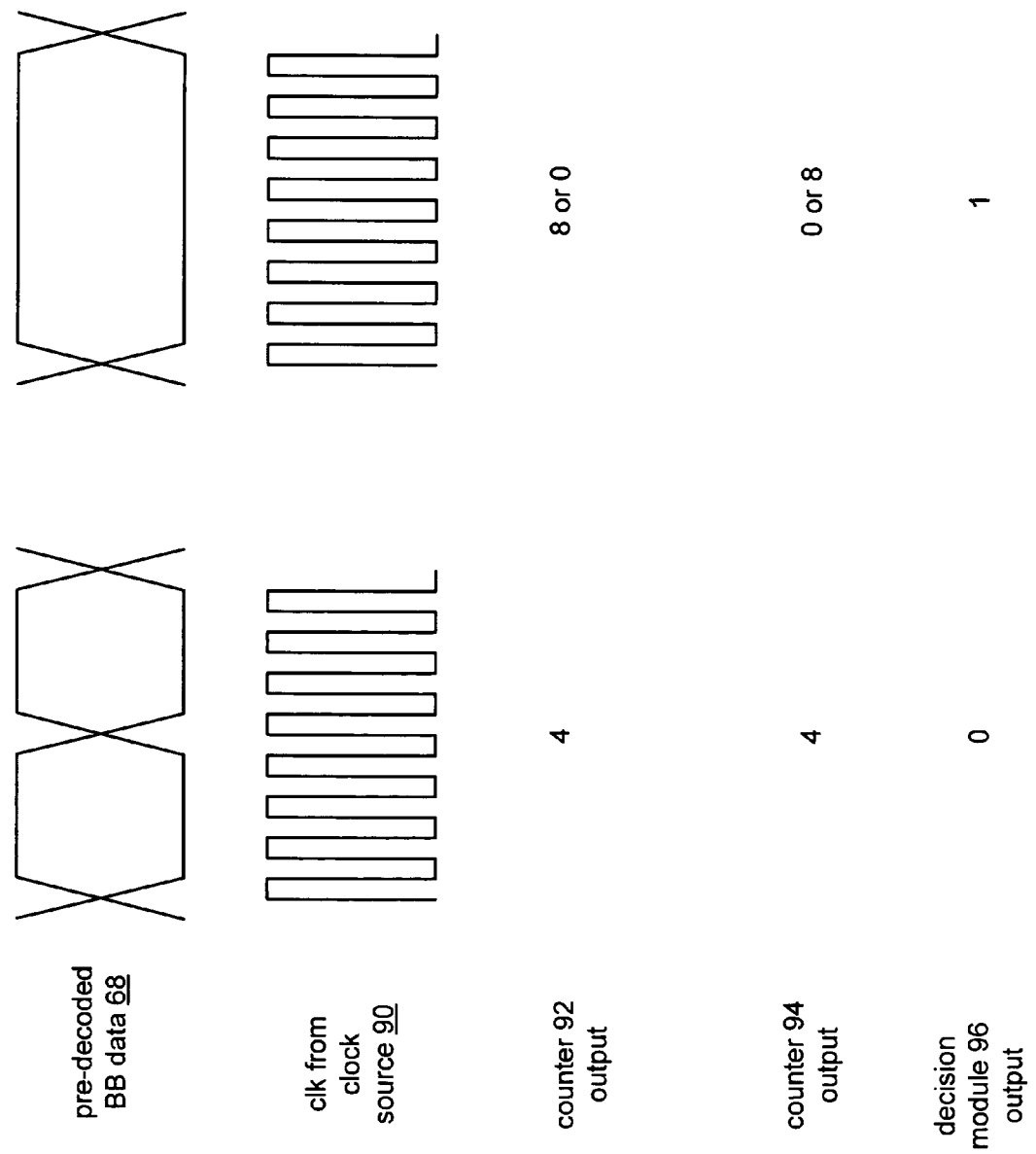
FIG. 5 is a diagram of an example of counting process based decoding in accordance with the present invention.

FIG. 5 is a diagram of an example of counting process based decoding performed by the decode module of FIG. 4. In this example, the pre-decoded BB data 68 is in accordance with the FM0 encoding. As shown, a logic 0 of the pre-decoded BB data 68 is represented by a state change within the bit boundaries and a logic one of the pre-decoded BB data 68 is presented by a constant state within the bit boundaries. In this example, the Nx clock source 90 is producing a clock signal that has a rate 8 times the bit rate (i.e., duration between bit boundaries of the pre-decoded BB data 68).

At the beginning of a new bit, either the first or second counter 92 or 94 is enabled based on the state of the pre-decoded BB data 68. For example, if the first counter 92 is enabled on the rise edge of a logic one state, then the second counter is enabled on the falling edge of a logic one state. Thus, for a logic 0 state of the pre-decoded BB data 68, either the first or the second counter 92 or 94 will be enabled based on the previous state of the pre-decoded BB data 68. In either case, with a transition within the center of the bit, both counters 92 and 94 will count approximately the same number of clock cycles. In this example, both counters 92 and 94 count 4 clock cycles. The decision module 96 compares the outputs of the counters 92 and 94 with a threshold value (e.g., 4) to determine that the current pre-decoded BB data 68 corresponds to a logic 0. Note that, the output of one counter may provide the threshold for the other or the thresholds may be a stored value based on N of the Nx clock source 90. Further note that there may be a tolerance to the comparison of the first and second counts with the thresholds for a favorable comparison. For example, if the first counter 92 had a count of 5 and the second counter had a count of 3 for an N of 8 of the Nx clock source 90, the decision module 96 could still accurately interpret the counts to decode a logic 0.

When the pre-decoded BB data 68 corresponds to an FM0 logic one, there is no transition within the bit. As such, either the first or the second counter 92 or 94 will produce a count of 8 for this example and the other would produce a count of 0. The decision module 96 compares the outputs of the counters 92 and 94 with a threshold value (e.g., 4) to determine that the current pre-decoded BB data 68 corresponds to a logic 1. Note that there may be a tolerance to the comparison of the first and second counts with the thresholds for a favorable or unfavorable comparison based on the rate of the clock signal. For example, if the first counter 92 had a count of 5 and the second counter had a count of 3 for an oversampling factor of 8 of the Nx clock source 90, the decision module 96 could still accurately interpret this as a favorable comparison to produce a logic 0. As a further example, if the first counter 92 had a count of 1 and the second counter had a count of 7 for an oversampling factor of 8 of the Nx clock source 90, the decision module 96 could still accurately interpret this as an unfavorable comparison to produce a logic 1.

Figure 6:
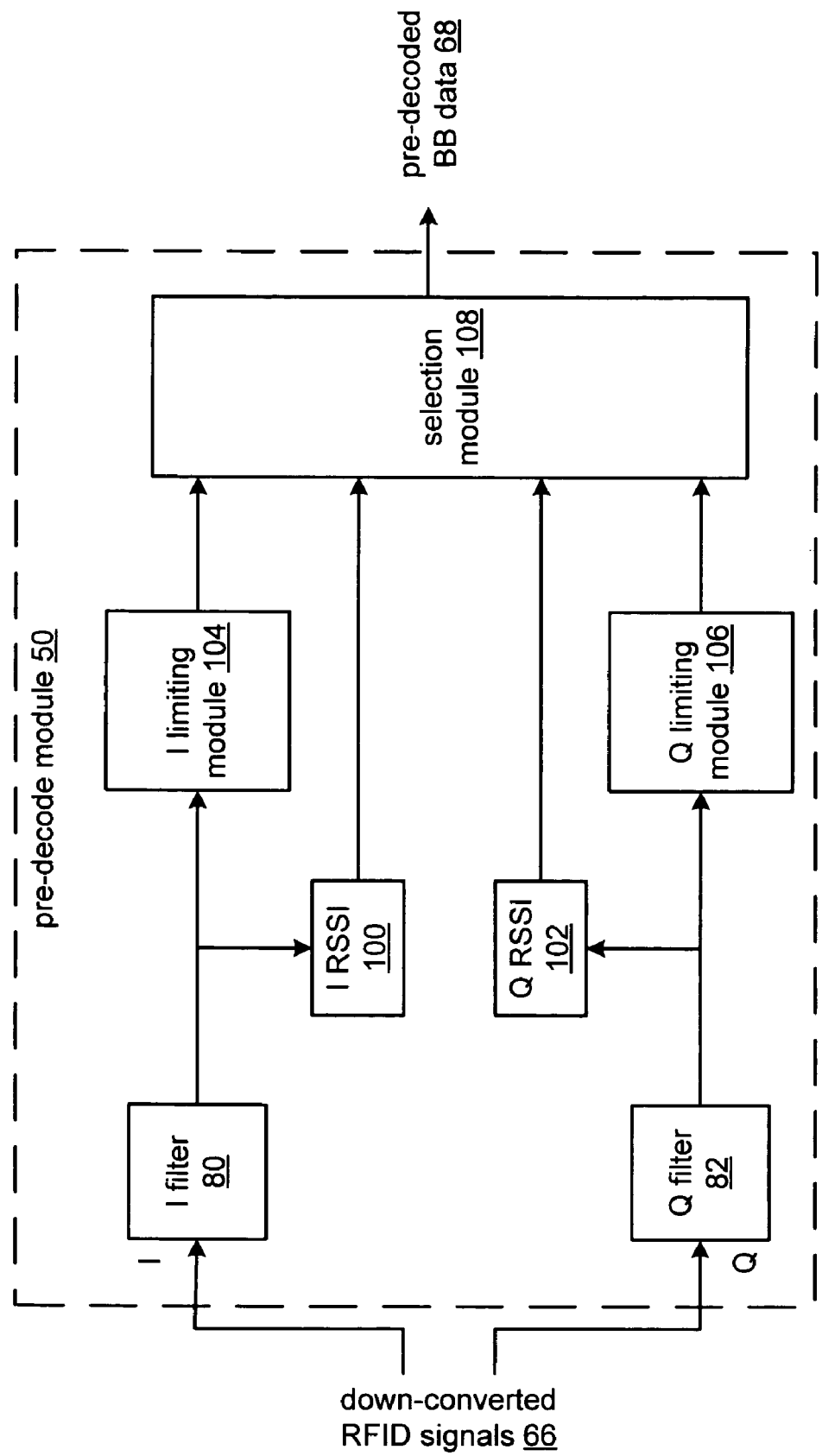
FIG. 6 is a schematic block diagram of an embodiment of a pre-decode module in accordance with the present invention.

FIG. 6 is a schematic block diagram of an embodiment of a pre-decode module 50 that includes the I filter 80, the Q filter 82, an I Received Signal Strength Indication (RSSI) module 100, a Q RSSI module 102, an I limiting module 104, a Q limiting module 106, and a selection module 106. In this embodiment, the I limiting module 104 limits the filtered I signals of the down-converted RFID signals 66 to produce limited I signals and the Q limiting module 106 limits the filtered Q signals of the down-converted RFID signals 66 to produce limited Q signals.

The I RSSI module 100 measures the signal strength of the filtered I signals to produce an I RSSI value and the Q RSSI module 102 measures the signal strength of the filtered Q signals to produce a Q RSSI value. Note that the measure of signal strength may be based on peak amplitude, average amplitude, root-mean-square of the amplitude, and/or any other computation, over a certain period of received signal or a certain number of received samples, yielding a representation of signal strength. Further note that the output of the RSSI modules 100 and 102 may be an analog or digital signal, where the analog RSSI signal may be digitized before being received by the selection module 108.

The selection module 108 receives the limited I signals, the limited Q signals, the I RSSI value, and the Q RSSI value. Based on a comparison of the RSSI values, the selection module 108 outputs the limited I signals or the limited Q signals as the pre-decoded BB data 68. For example, if the Q RSSI value is greater than the I RSSI value, the selection module 108 may output the limited Q signals as the pre-decoded BB data 68. Note that the selection module 108 may make such a decision on a bit by bit basis. Further note that the comparison of I RSSI with Q RSSI may include hysteresis to reduce the occurrence of alternating selection of the limited I signals and the limited Q signals. Still further note that the pre-decoded BB data 68 produced by the pre-decoding module 50 of FIG. 6 may be provided to the decode module 52 of FIG. 4 for decoding.

Figure 7:
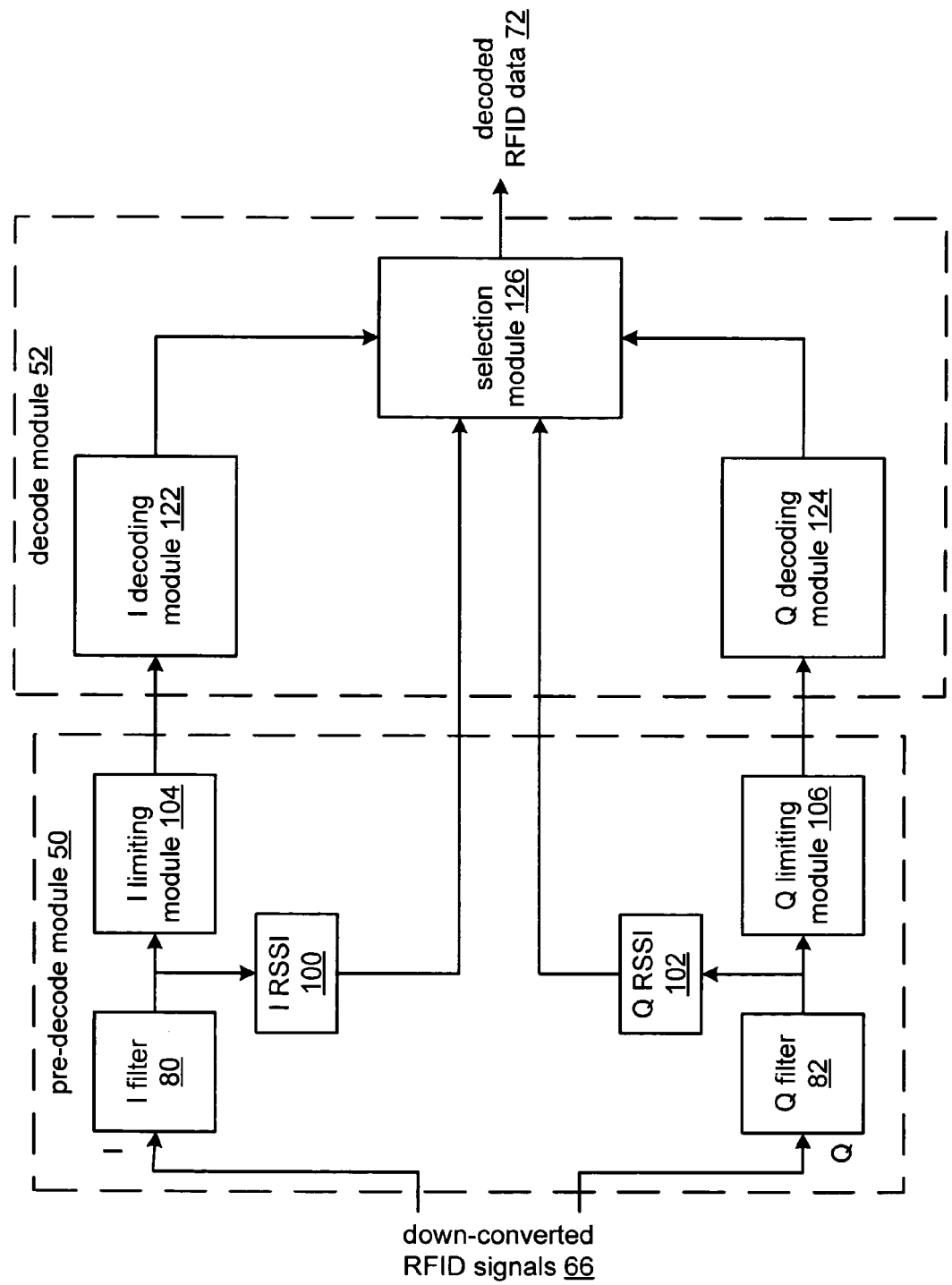
FIG. 7 is a schematic block diagram of another embodiment of an RFID decoding subsystem in accordance with the present invention.

FIG. 7 is a schematic block diagram of another embodiment of an RFID decoding subsystem that includes the pre-decode module 50 and the decode module 52. In this embodiment, the pre-decode module 50 includes the I filter 80, the Q filter 82, the I RSSI module 100, the Q RSSI module 102, the I limiting module 104, and the Q limiting module 106. In this embodiment, the limited I signals and the limited Q signals represent the pre-decoded baseband data 68 and the I and Q RSSI values represent the corresponding decoding information 70.

The decode module 52 includes an I decoding module 122, a Q decoding module 124, and a selection module 126. Each of the I and Q decoding modules 124 and 126 may be constructed in accordance with the decode module of FIG. 4, any other decode module disclosed herein, and/or any other bi-phase decoder.

The selection module 126 receives the decoded I bit(s), the decoded Q bit(s), the I RSSI value(s), and the Q RSSI value(s) on a bit by bit basis or a word (e.g., 2 or more bits) by word basis. Based on a comparison the I RSSI value(s) and the Q RSSI value(s), the selection module 126 outputs the decoded I bit(s) or the decoded Q bit(s) as the decoded RFID data 72. Note that the comparison of I RSSI with Q RSSI may include hysteresis to reduce the occurrence of alternating selection of the limited I signals and the limited Q signals.

As an extension of this embodiment, the selection module 126 may enable the I or the Q decoding module 122 or 124 to perform a counting process based decode, where the selection is made based on the I and Q RSSI values. In this instance, the decode module 52, via the selection module 126, may monitor for decoding errors over a plurality of data bit intervals, which may be determine via a cyclic redundancy check (CRC) algorithm. When a decoding error exists, the selection module 126 enables the other one of the I or the Q decoding module 122 or 124 to perform the counting process based decoding. In other words, use the complimentary pre-decoding path to decode the pre-decoded baseband data when errors exist in the initially selected path.

Figure 8:
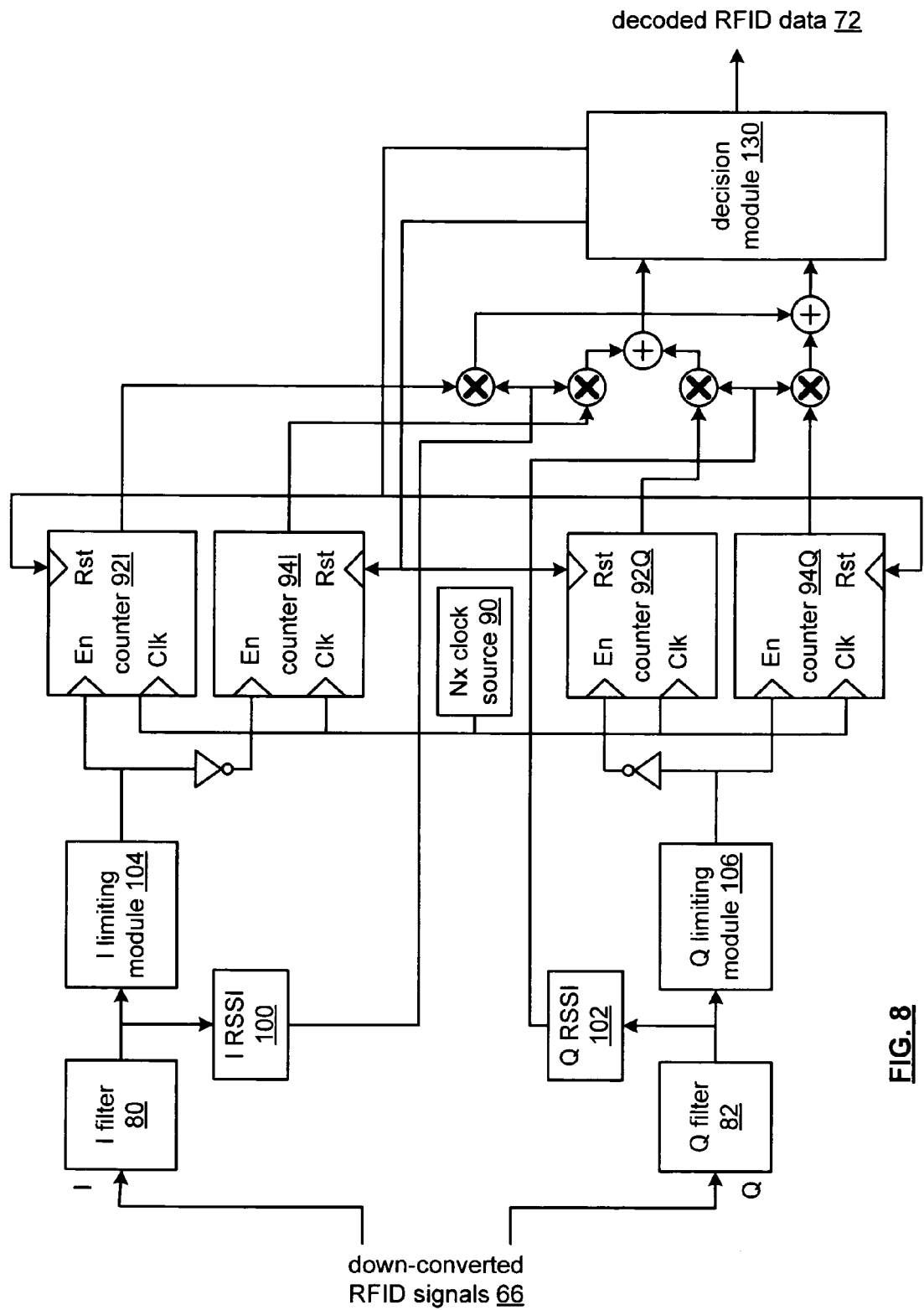
FIG. 8 is a schematic block diagram of another embodiment of an RFID decoding subsystem in accordance with the present invention.

FIG. 8 is a schematic block diagram of another embodiment of an RFID decoding subsystem that includes the pre-decode module 50 and the decode module 52. In this embodiment, the delineation between the pre-decode module 50 and the decode module 52 may vary. For instance, in one embodiment, the pre-decode module 50 includes the I filter 80, the Q filter 82, the I RSSI module 100, the Q RSSI module 102, the I limiting module 104, and the Q limiting module 106. In another delineation, the decode module 52 includes the decision module 130 and the pre-decode module 50 includes the other components.

In operation, the I filter 80, the Q filter 82, the I RSSI module 100, the Q RSSI module 102, the I limiting module 104, and the Q limiting module 106 function as previously discussed. Counters 92I and 92Q count clock cycles of the Nx clock source 90 based on the I limited signals and counters 92Q and 94Q count clock cycles based on the Q limited signals. The counts of counters 92I and 94I are weighted based on the I RSSI value and the counts of counters 92Q and 94Q are weighted based on the Q RSSI value. The weighted counts of counters 92I and 92Q are combined and provide one input to the decision module 130. The weighted counts of counters 94I and 94Q are combined and provide the other input to the decision module 130. The decision module 130 uses the weighted counts to produce the decoded RFID data 72.

As an example, assume that FM0 encoding is used such that a logic 0 is represented by a state change in the middle of the bit and a logic 1 is represented by a constant state throughout the bit. With reference to FIG. 5, four count values would be produced for each logic state. For instance, for a logic 0, each counter would produce a count of approximately four. The counts are then weighted based on the corresponding RSSI values, which are then combined and decoded as previously stated.

Figure 9:
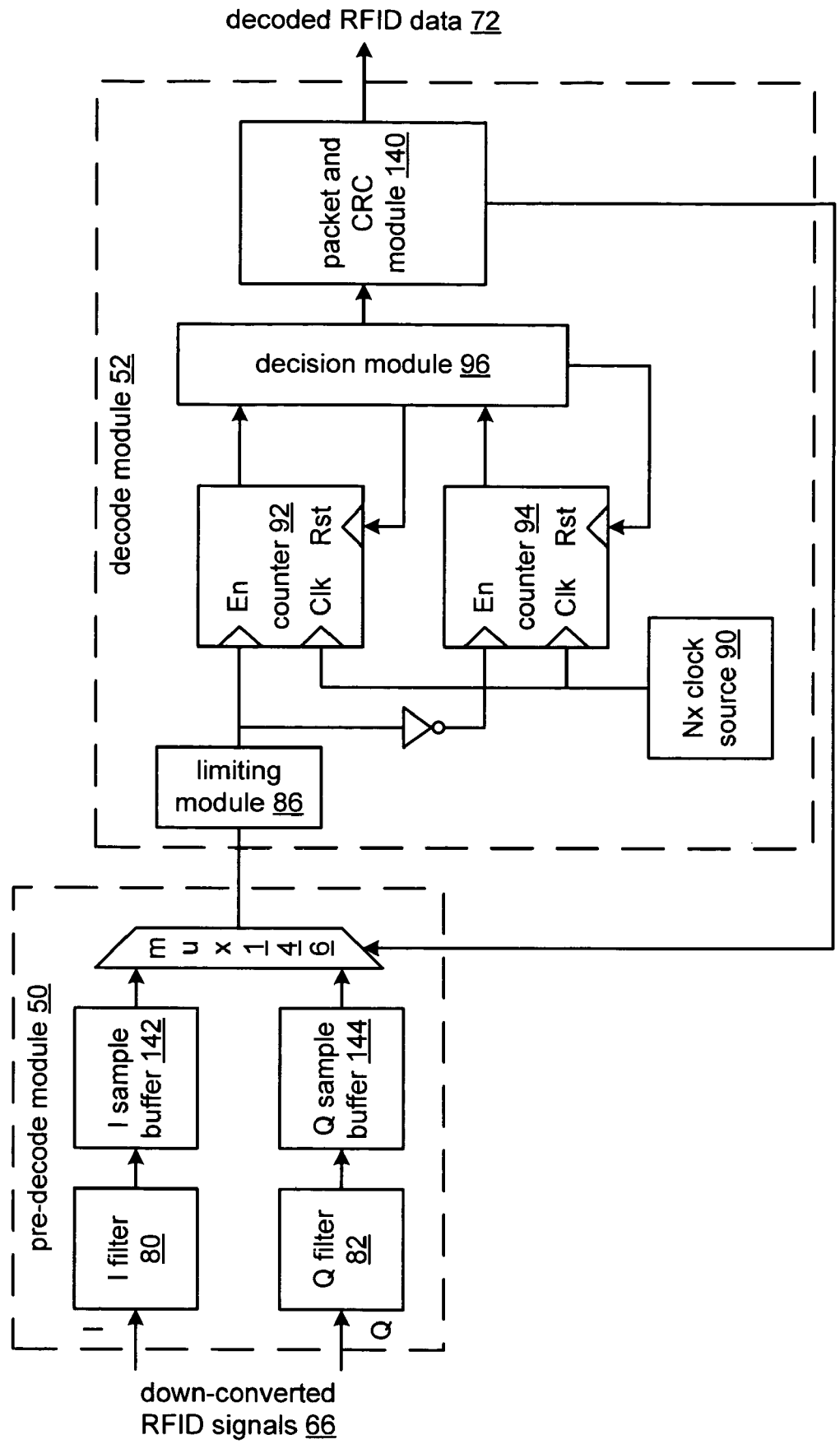
FIG. 9 is a schematic block diagram of another embodiment of an RFID decoding subsystem in accordance with the present invention.

FIG. 9 is a schematic block diagram of another embodiment of an RFID decoding subsystem that includes the pre-decode module 50 and the decode module 52. The pre-decode module 50 includes the I filter 80, the Q filter 82, an I sample buffer 142, a Q sample buffer 144, and a multiplexer 146. The decode module 52 includes a limiting module 86, counter 92, counter 94, Nx clock source 90, a decision module 96, and a packet and CRC module 140. In an alternate embodiment, the limiting module 86 may include two modules coupled between the filters 80 and 82 and sample buffers 142 and 144, respectively.

In this embodiment, the I and Q sample buffers 142 and 144 store at least a word of filtered I signal components and filtered Q signal components, respectively. The multiplexer 146 outputs the stored filtered I signal components or the filtered Q signal components based on a control signal provided by the packet and CRC module 140. The limiting module 86, the counters 92 and 94, and the decision module 96 function as previously described to produce decoded RFID bits of data.

The packet and CRC module 140 collect the decoded RFID bits of data at a word level. When a word of decoded data bits is stored, the module 140 performs a CRC check on the word. If the word passes the CRC, the control signal remains in the same state for the next word. If, however, the word fails the CRC, the control signal is toggled such that the other path provides the inputs to the counters 92 and 94 for the current word. The module 140 outputs a word of decoded RFID data 72 when the current word passes the CRC.

FIG. 10 is a schematic block diagram of another embodiment of a pre-decode module 50 that includes a limiter 150 and a frequency divider module 152. In this embodiment, the limiter 150 is coupled to limit the down-converted RFID signals to produce limited RFID signals. The frequency divider module 152 is coupled to reduce frequency of the limited RFID signals to correspond to a rate of one of: FM0 and FM1 data as the pre-decoded BB data 68. For instance, the frequency divider module 152 can convert a four-interval bit cell encoded data to a bi-phase FM0 or FM1 encoded data. As an example, a logic 0 of Electronic Product Code (EPC) class 1 (RFID standard) is represented as a transition from one state to another within a bit and a logic 1 is represented by four transitions from a first state to a second, back to the first, and then to the second. By reducing the rate of the EPC class 1 by a factor of two, the number of state changes per bit is reduced by two. Thus, a logic 0 now has one state and a logic 1 has two states, which corresponds to FM1 encoding.

FIG. 11 is a schematic block diagram of a portion of another embodiment of a pre-decode module 50 that includes a digital down conversion module 156. The digital down conversion module 156 is coupled to convert the down converted RFID signals 66, which have an intermediate carrier frequency, into down converted RFID signals 66 at baseband. Once the down converted RFID signals 66 are at baseband, the pre-decoding as previously discussed may be used to produce the pre-decoded BB data 68.

Figure 12:
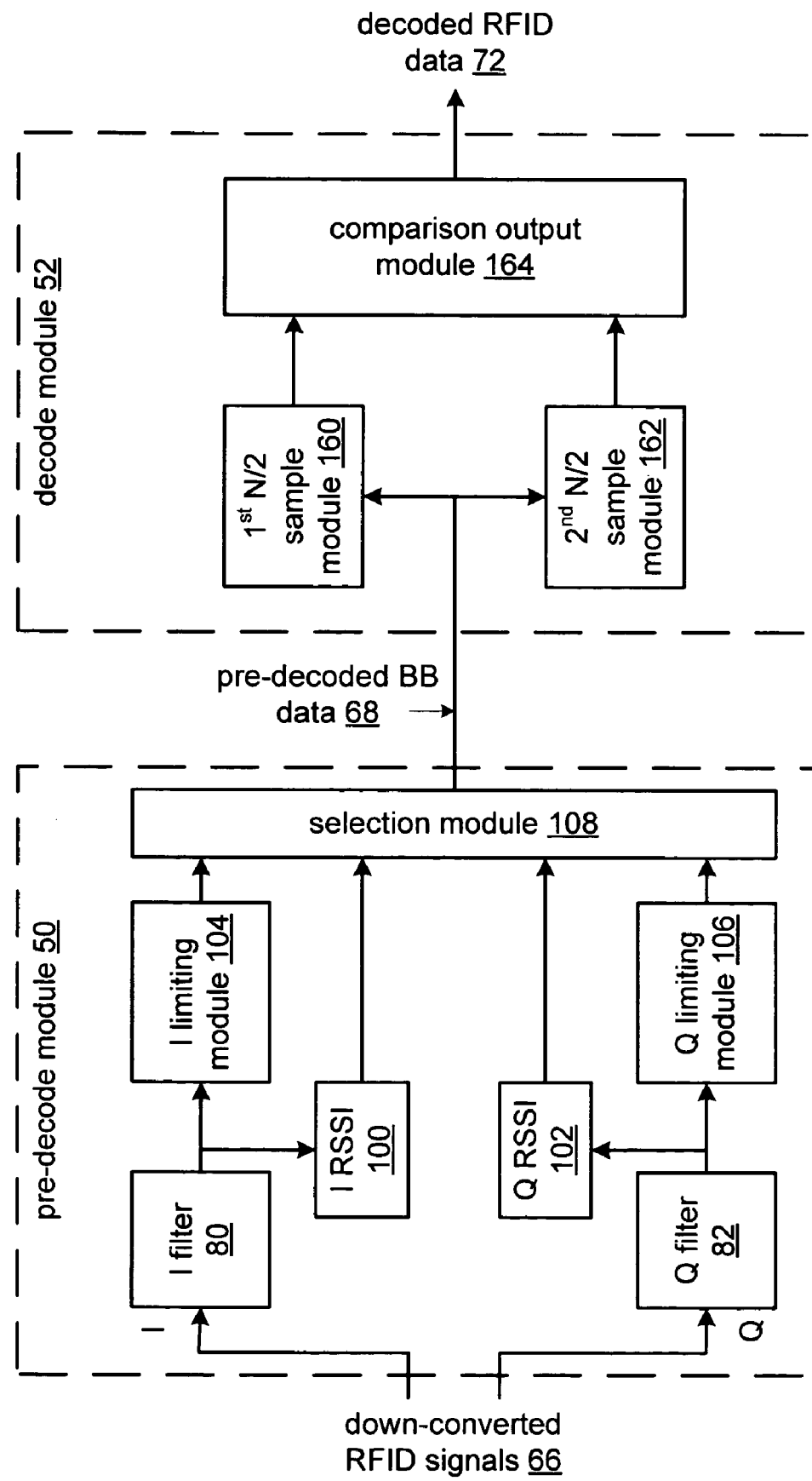
FIG. 12 is a schematic block diagram of another embodiment of an RFID decoding subsystem in accordance with the present invention.

FIG. 12 is a schematic block diagram of another embodiment of an RFID decoding subsystem that includes the pre-decode module 50 and the decode module 52. The pre-decode module 50 corresponds to the pre-decode module 50 discussed with reference to FIG. 6. Note that in another embodiment, the I limiting module 104 and the Q limiting module 106 of the pre-decode module 50 may be removed.

The decode module 52 includes a $1^{st}$ N/2 sample module 160, a $2^{nd}$ N/2 sample module 162 and a comparison output module 164. The N/2 sample modules 160 and 162 sample the pre-decoded BB data at N times the bit rate. Then $1^{st}$ N/2 sample module 160 processes the first half of samples in one bit period of the pre-decoded BB data 68 and produces a first decision metric. The $2^{nd}$ N/2 sample module 162 processes the second half of samples in one bit period of the pre-decoded BB data 68 and produces a second decision metric. In one embodiment, the decision metric may be the sign of the majority of N/2 samples (assuming bipolar +1 and −1 samples). In another embodiment, the decision metric may be the average amplitude of N/2 samples (assuming unipolar 0 and 1 samples). The comparison module 164 compares the first and the second decision metrics to produce the decoded RFID data 72.

Figure 13:
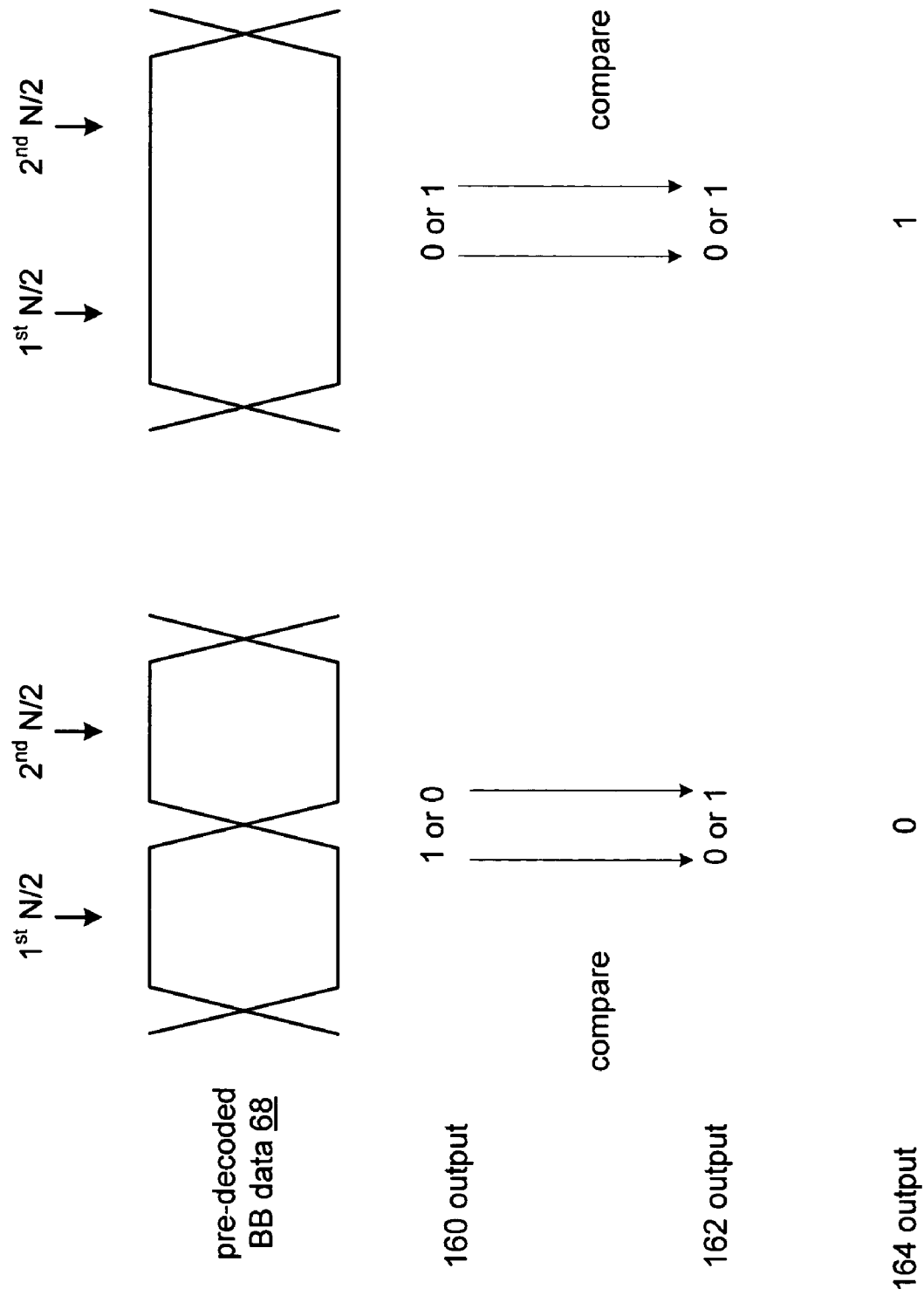
FIG. 13 is a diagram of an example of sample based decoding in accordance with the present invention.

FIG. 13 is a diagram of an example of sample based decoding performed by the decode module of FIG. 12. In this example, the data is FM0 encoded such that a logic 0 is represented by a transition between two states and a logic 1 is represented by a single state. The $1^{st}$ and $2^{nd}$ N/2 sampling points are shown for both a logic 0 encoded bit and a logic 1 encoded bit. In this example, N is set to 2, i.e., there are two samples in one data bit interval, and the $1^{st}$ N/2 sample module 160 and the $2^{nd}$ N/2 sample module 162 each process one sample. In other examples N may be equal to any other number, in which case the $1^{st}$ and $2^{nd}$ sample modules each would process half of the samples in one bit interval and using averaging, majority selection, etc., would produce the corresponding decision metrics for the comparison module 164. In this example, for a logic 0 encoded bit, the $1^{st}$ sample module 160 outputs a 1 or a 0, as the first decision metric, depending on the starting state of the encoded bit and the $2^{nd}$ sample module 162 outputs the opposite 0 or 1 as the second decision metric. By comparing the two decision metrics, which are different for a logic 0, the comparison module 164 produces a logic 0 decoded bit.

For a logic 1 encoded bit, the $1^{st}$ sample module 160 outputs a 1 or a 0 depending on the starting state of the encoded bit and the $2^{nd}$ sample module 162 outputs the same 1 or 0. By comparing the two decision metrics samples, which are the same for a logic 1, the comparison module 164 produces a logic 1 decoded bit.

Figure 14:
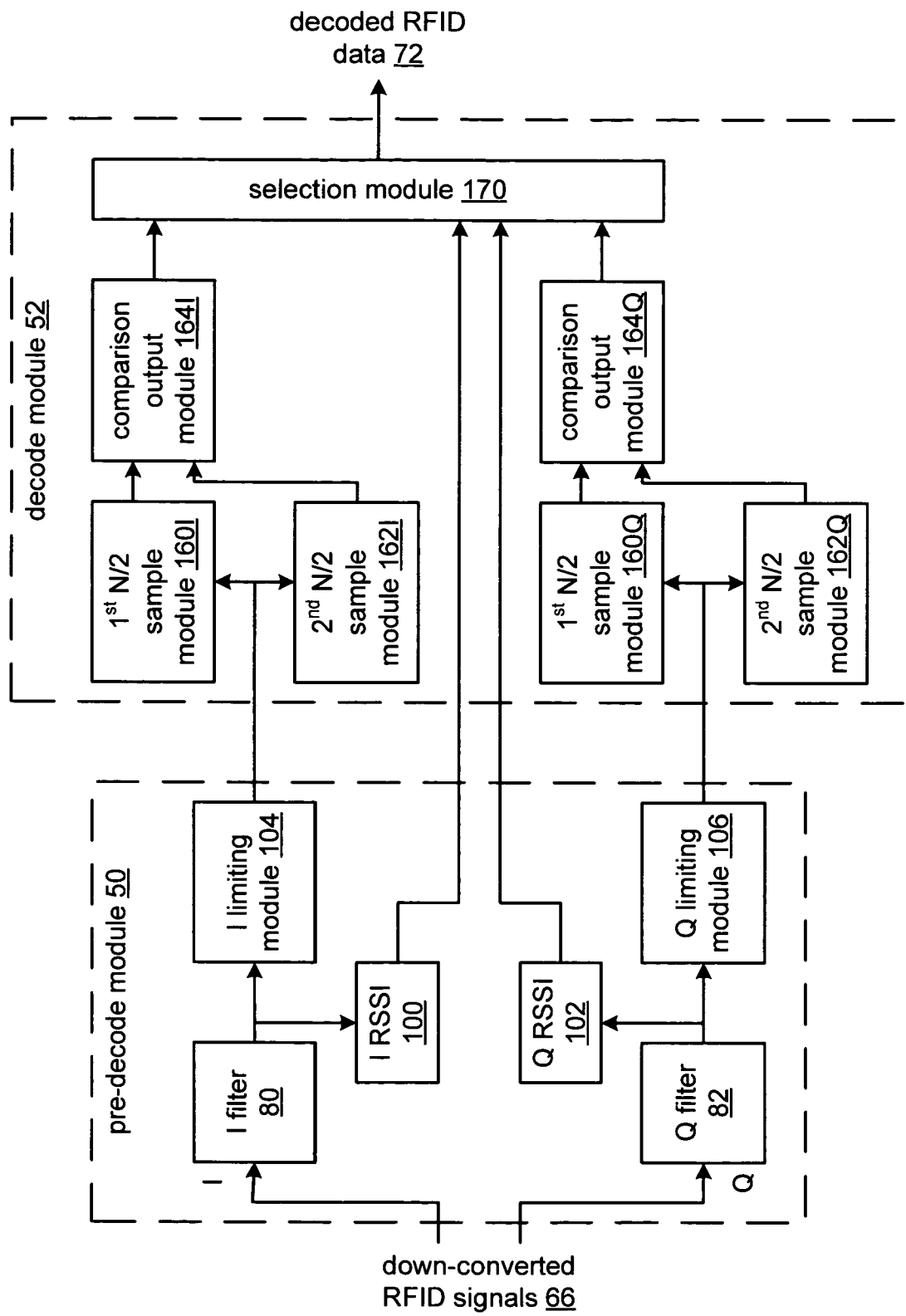
FIG. 14 is a schematic block diagram of another embodiment of an RFID decoding subsystem in accordance with the present invention.

FIG. 14 is a schematic block diagram of another embodiment of an RFID decoding subsystem that includes the pre-decode module 50 and the decode module 52. The pre-decode module 50 is similar to the pre-decode module of FIG. 7. The decode module 52 includes an I decoder, a Q decoder, and a selection module 170. The I decoder includes a $1^{st}$ N/2 sample module 1601, a $2^{nd}$ N/2 sample module 1621 and a comparison output module 1641 and the Q decoder includes a $1^{st}$ N/2 sample module 160Q, a $2^{nd}$ N/2 sample module 162Q and a comparison output module 164Q. The I and Q decoders function similarly to the decode module of FIG. 12 to produce I decoded RFID data and Q decoded RFID data. The selection module 170 selects the I decoded RFID data or the Q decoded RFID data based on the I RSSI value and the Q RSSI value. In an alternate embodiment, the I RSSI value and the Q RSSI value may be used to weight the outputs of $1^{st}$ and $2^{nd}$ N/2 sample modules on I and Q channels, respectively, which will then be combined to provide the inputs to a comparison output or a decision module, as previously discussed with reference to FIGS. 7 and/or 8.

FIG. 15 is a schematic block diagram of another embodiment of an RFID decoding subsystem that includes the pre-decode module 50 and the decode module 52. The pre-decode module includes the I filter 80, the Q filter 82, the I limiting module 104, and the Q limiting module 106 to produce a limited I component signal and a limited Q component signal. The decode module 52 functions to mix the limited in-phase component signals with a reference oscillation to produce mixed in-phase component signals; mix the limited quadrature component signals with a quadrature reference oscillation to produce mixed quadrature component signals; and process the mixed in-phase component signals and the mixed quadrature component signals to produce decoded RFID data, wherein the reference oscillation and the quadrature reference oscillation are based on rate of encoded RFID data.

In one embodiment, the decode module 52 includes mixer 190, mixer 192, a reference oscillation 180, and a decode processing module 182. The decode processing module 182 may include a D flip-flop 184, a filter 186, and a filter 188. In operation, the mixer 192 mixes the limited I component signal with the reference oscillation to produce a $1^{st}$ mixed signal and mixer 190 mixes the limited Q component signal with the reference oscillation to produce a $2^{nd}$ mixed signal. For example, if the data is FSK encoded in accordance with EPC class 0 where a first state (e.g., a logic 0) is represented by f1 (e.g., 2.25 MHz) and a second state (e.g., a logic 1) is represented by f2 (e.g., 3.25 MHz), and the reference oscillation is represented by (f1+f2)/2 (e.g., (2.25+3.25)/2=2.75 MHz), the resulting mixed signals are a product of the state of the limited I and Q component signals and the reference oscillation.

The mixed signals are subsequently filtered by filters 186 and 188, which may be low pass filters or band pass filters. The filtered $1^{st}$ mixed signal is provided to the D input of the D flip-flop 184 and the filtered $2^{nd}$ mixed signal is provide to the clock input of the D flip-flop 184. In this manner, when an encoded logic 1 is being processed (e.g., the limited I and Q components having a frequency of 3.25 MHz), the $1^{st}$ mixed signal (i.e., the limited I component signal mixed with the reference oscillation) will be in a logic 1 state at the rising edge of the second mixed signal (i.e., the limited Q component signal mixed with the reference oscillation). When an encoded logic 0 is being processed (e.g., the limited I and Q components having a frequency of 2.25 MHz), the $1^{st}$ mixed signal will be in a logic 0 state at the rising edge of the second mixed signal. In this way, the D Flip-Flop 184 produces the RFID decoded data 72.

As one of ordinary skill in the art will appreciate, the limiting modules in the above figures may be omitted if the signal level of the encoded bits is of a sufficient and consistent magnitude. As one of ordinary skill in the art will further appreciate, in any of the above embodiments, a limiting module may be implemented via an analog to digital converter.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency identification (RFID) decoding subsystem comprises:
   pre-decode module coupled to process down-converted RFID signals into pre-decoded baseband data; and
   decode module coupled to:
      enable a counting process based on the pre-decoded baseband data to produce a count resultant;
      compare the count resultant with a threshold at a data bit interval to produce decoded RFID data;
      determine whether a decoding error exists for the RFID data over a plurality of data bit intervals;
         when the decoding error exists, enable the counting process based on complimentary pre-decoded baseband data to produce a complimentary count resultant; and
         compare the complimentary count resultant with the threshold at the data bit interval to produce decoded RFID data.

2. The RFID decoding subsystem of claim 1, wherein the pre-decoded baseband data comprises at least one of:
   amplitude estimation of the down-converted RFID signals; and
   limited in-phase component signals or limited quadrature component signals selected based on received signal strength of in-phase component and quadrature component of the down-converted RFID signals.

3. The RFID decoding subsystem of claim 1, wherein the decode module comprises:
   a clock source coupled to generate a clock signal having a rate greater than an inverse of the data bit interval;
   a first counter enabled based on a first state of the pre-decoded baseband signal to count cycles of the clock signal during at least one period of the data bit interval to produce a first count;
   a second counter enabled based on a second state of the pre-decoded baseband signal to count cycles of the clock signal during at least one period of the data bit interval to produce a second count; and
   decision module coupled to produce the decoded RFID data based on the first and second counts.

4. The RFID decoding subsystem of claim 3, wherein the decision module functions to:
   compare at least one of the first and second counts with at least one threshold;
   when the at least one of the first and second counts compare unfavorably with the at least one threshold, decode the pre-decoded baseband signal for the at least one period of the data bit interval as a first decoded value; and
   when the at least one of the first and second counts compares favorably with the at least one threshold, decode the pre-decoded baseband signal for the at least one period of the data bit interval as a second decoded value.

5. The RFID decoding subsystem of claim 1, wherein the pre-decode module comprises:
   an In-Phase filter;
   a Quadrature filter;
   an amplitude estimation module; and
   a limiting module.

6. A radio frequency identification (RFID) decoding subsystem comprises:
   pre-decode module coupled to process down-converted RFID signals into pre-decoded baseband data, wherein the pre-decoded baseband data comprises:
      limited in-phase signals;
      limited quadrature signals; and
      a representation of signal strength of the pre-decoded baseband data; and
   decode module coupled to:
      sample the pre-decoded baseband data at a rate greater than a data rate to produce at least
      a first decision metric and a second decision metric' per data bit interval;
      compare the first and second decision metrics;
      when the first and second decision metrics substantially match, produce a first decoded value; and
      when the first and second decision metrics do not substantially match, produce a second decoded value.

7. The RFID decoding subsystem of claim 6, wherein the decode module comprises:
   a first sampling module coupled to produce the first decision metric during a first portion of the data bit interval;
   a second sampling module coupled to produce the second decision metric during a second portion of the data bit interval; and
   comparison module coupled to compare at least one of sign and magnitude of the first and second decision metrics to produce the first or second decoded value.

8. The RFID decoding subsystem of claim 7, wherein each of the first and second sampling modules comprises:
   a clock source coupled to produce a clock signal having a rate greater than an inverse of the data bit interval;
   a first counter coupled to count a first state of the pre-decoded baseband data during the first or second portion of the data bit interval to produce a first count, wherein the first counter is clocked by the clock signal;
   a second counter coupled to count a second state of the pre-decoded baseband data during the first or second portion of the data bit interval to produce a second count, wherein the second counter is clocked by the clock signal; and
   output module coupled to:
      compare the first count with the second count;
      output the first state as the first or second decision metric when the first count compared favorably to the second count; and
      output the second state as the first or second decision metric when the first count compared unfavorably to the second count.

9. The RFID decoding subsystem of claim 6, wherein the decode module comprises:
   an in-phase decode module coupled to:
      sample the limited in-phase signals at the rate greater than the data rate to produce at least a first in-phase decision metric and a second in-phase decision metric per data bit interval;
      compare the first and second in-phase decision metric;
      when the first and second in-phase decision metrics substantially match, produce a first in-phase decoded value; and when the first and second in-phase decision metrics do not substantially match, produce a second in-phase decoded value;

a quadrature decode module coupled to:
sample the limited quadrature signals at the rate greater than the data rate to produce at least a first quadrature decision metric and a second quadrature decision metric per data bit interval;
compare the first and second quadrature decision metrics;
when the first and second quadrature decision metrics substantially match, produce a first quadrature decoded value; and
when the first and second quadrature decision metrics do not substantially match, produce a second quadrature decoded value;

a selection module operably coupled to provide the first or second in-phase decoded value as the first or second decoded value when the representation of signal strength of the pre-decoded baseband data is in an in-phase state and provide the first or second quadrature decoded value as the first or second decoded value when the representation of signal strength of the pre-decoded baseband data is in a quadrature state.

10. A radio frequency identification (RFID) decoding subsystem comprises:
pre-decode module coupled to process down-converted RFID signals into limited in-phase component signals and limited quadrature component signals; and
decode module coupled to:
mix the limited in-phase component signals with a reference oscillation to produce mixed in-phase component signals;
mix the limited quadrature component signals with a quadrature reference oscillation to produce mixed quadrature component signals; and
process the mixed in-phase component signals and the mixed quadrature component signals to produce decoded RFID data by sampling one of the mixed in-phase component signals and the mixed quadrature component signals by another one of the mixed inphase component signals and the mixed quadrature component signals to produce the decoded RFID data, wherein the reference oscillation and the quadrature reference oscillation are based on rate of encoded RFID data.

11. The RFID decoding subsystem of claim 10, wherein the decode module comprises: a D flip-flop having a D input, a clock input, and an output, wherein the D input is 30 coupled to receive the mixed in-phase component signals and the clock input is coupled to receive the mixed quadrature component signals, and wherein the output provides the decoded RFID data.

12. The RFID decoding subsystem of claim 10 comprises:
a first rate of oscillation to represent a first state of the down-converted RFID signals;
a second rate of oscillation to present a second state of the down-converted RFID signals; and
the reference oscillation having a rate based on the a function of the first and second rates.

13. The RFID decoding subsystem of claim 10, wherein the pre-decode module comprises:
an In-Phase filter;
a Quadrature filter;
an amplitude estimation module; and
a limiting module.

14. A radio frequency identification (RFID) decoding subsystem comprises:
pre-decode module coupled to process down-converted RFID signals into limited in-phase component signals and limited quadrature component signals; and
decode module comprising:
a first mixer operable to mix the limited in-phase component signals with a reference oscillation to produce mixed in-phase component signals;
a second mixer operable to mix the limited quadrature component signals with a quadrature reference oscillation to produce mixed quadrature component signals, wherein the reference oscillation and the quadrature reference oscillation are based on a rate of encoded RFID data; and
a D flip-flop having a D input, a clock input, and an output, wherein the D input is coupled to receive the mixed in-phase component signals and the clock input is coupled to receive the mixed quadrature component signals, and wherein the output provides the decoded RFID data.

15. The RFID decoding subsystem of claim 14, comprises:
a first rate of oscillation to represent a first state of the down-converted RFID signals;
a second rate of oscillation to present a second state of the down-converted RFID signals; and
the reference oscillation having a rate based on the a function of the first and second rates.

16. The RFID decoding subsystem of claim 14, wherein the pre-decode module comprises:
an In-Phase filter;
a Quadrature filter;
an amplitude estimation module; and
a limiting module.

* * * * *

UNITED STATES PATENT AND TRADEMARK OFFICE
CERTIFICATE OF CORRECTION

PATENT NO. : 7,991,080 B2
APPLICATION NO. : 11/491020
DATED : August 2, 2011
INVENTOR(S) : Kambiz Shoarinejad Page 1 of 1

It is certified that error appears in the above-identified patent and that said Letters Patent is hereby corrected as shown below:

Col. 15, line 50 in claim 11: after "the D input is" delete "30"

Signed and Sealed this
Twelfth Day of February, 2013

Teresa Stanek Rea
*Acting Director of the United States Patent and Trademark Office*